(12) United States Patent
Nakagaki et al.

(10) Patent No.: US 7,637,343 B2
(45) Date of Patent: Dec. 29, 2009

(54) SMALL-SIZED VEHICLE

(75) Inventors: Seiji Nakagaki, Shizuoka (JP); Kazuhiko Izumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 549 days.

(21) Appl. No.: 11/350,326

(22) Filed: Feb. 8, 2006

(65) Prior Publication Data
US 2007/0181358 A1 Aug. 9, 2007

(51) Int. Cl.
*B60K 17/34* (2006.01)
(52) U.S. Cl. .................. 180/233; 180/383; 180/908
(58) Field of Classification Search .............. 180/233, 180/244, 292, 370, 383, 908, 379, 240, 376, 180/212, 245, 246
See application file for complete search history.

(56) References Cited

U.S. PATENT DOCUMENTS

| | | | | |
|---|---|---|---|---|
| 1,123,400 A | * | 1/1915 | Shwoob ..................... | 180/237 |
| 1,129,643 A | * | 2/1915 | Christenen .................. | 180/254 |
| 4,719,984 A | * | 1/1988 | Watanabe ................... | 180/226 |
| 5,515,940 A | * | 5/1996 | Shichinohe et al. ......... | 180/376 |
| 6,182,784 B1 | * | 2/2001 | Pestotnik .................... | 180/376 |
| 6,182,785 B1 | | 2/2001 | Handa et al. | |
| 6,632,144 B1 | * | 10/2003 | Narita et al. ................ | 464/179 |
| 6,805,217 B2 | * | 10/2004 | Kinouchi et al. ........... | 180/233 |
| 6,883,630 B2 | * | 4/2005 | Morin ........................ | 180/244 |
| 6,904,992 B2 | * | 6/2005 | Miguchi .................... | 180/244 |
| 7,204,352 B2 | * | 4/2007 | Seki .......................... | 188/73.34 |
| 2001/0023788 A1 | * | 9/2001 | Inagaki et al. .............. | 180/197 |
| 2003/0205427 A1 | * | 11/2003 | Ima ........................... | 180/370 |

\* cited by examiner

*Primary Examiner*—Anne Marie M Boehler
(74) *Attorney, Agent, or Firm*—Keating & Bennett, LLP

(57) ABSTRACT

A small-sized vehicle, such as an ATV (All Terrain Vehicle), includes an engine having an output shaft, a front gear mechanism including a first shaft on a side of a front wheel to which a drive force from a front output shaft portion of the output shaft is transmitted, and a rear gear mechanism including a first shaft on a side of a rear wheel to which a drive force from a rear output shaft portion of the output shaft is transmitted. The front output shaft portion of the output shaft and the first shaft of the front gear mechanism are arranged substantially coaxial with each other, and the rear output shaft portion of the output shaft and the first shaft of the rear gear mechanism are arranged substantially coaxial with each other. The small-sized vehicle is capable of preventing vibrations and noise from being generated.

14 Claims, 9 Drawing Sheets

SMALL-SIZED VEHICLE

BACKGROUND OF THE INVENTION

1. Field of the Invention

The present invention relates to a small-sized vehicle, and more particularly, to a small-sized vehicle provided with an engine which includes an output shaft to transmit a drive force to a front wheel and a rear wheel.

2. Description of the Related Art

Conventionally, there are known small-sized vehicles provided with an engine which include an output shaft to transmit a drive force to a front wheel and a rear wheel. Such a small-sized vehicle is disclosed in, for example, U.S. Pat. No. 6,182,785.

U.S. Pat. No. 6,182,785 discloses a buggy (small-sized vehicle) including an engine having an output shaft that transmits a drive force to front wheels and rear wheels, a front gear mechanism including a front propeller shaft which transmits a drive force to front wheels and to which a drive force from the output shaft is transmitted, and a rear gear mechanism including a rear propeller shaft which transmits a drive force to rear wheels and to which a drive force from the output shaft is transmitted. With the buggy, the output shaft and the front propeller shaft of the front gear mechanism are arranged coaxially with each other, and the rear propeller shaft of the rear gear mechanism is arranged to intersect the output shaft at a predetermined angle with a universal joint therebetween.

When the output shaft and the rear propeller shaft of the rear gear mechanism, which intersect each other at a predetermined angle, are connected to each other through a conventional, general universal joint as in the buggy (small-sized vehicle) disclosed in U.S. Pat. No. 6,182,785, the rear propeller shaft of the rear gear mechanism is rotated while varying in angular velocity so that there is caused a problem that vibrations and noise are generated with the variation in angular velocity.

SUMMARY OF THE INVENTION

In order to overcome the problems described above, preferred embodiments of the present invention provide a small-sized vehicle capable of preventing vibrations and noise from being generated.

A small-sized vehicle according to one preferred embodiment of the present invention includes an engine having an output shaft having a front output shaft portion that transmits a drive force to a front wheel, and a rear output shaft portion that transmits a drive force to a rear wheel, a front gear mechanism including a first shaft on a side of the front wheel which transmits a drive force to the front wheel and to which a drive force from the front output shaft portion of the output shaft is transmitted, and a rear gear mechanism including a first shaft on a side of the rear wheel which transmits a drive force to the rear wheel and to which a drive force from the rear output shaft portion of the output shaft is transmitted, the front output shaft portion of the output shaft and the first shaft of the front gear mechanism are arranged substantially coaxially with each other, and the rear output shaft portion of the output shaft and the first shaft of the rear gear mechanism are arranged substantially coaxial with each other.

With the small-sized vehicle in the present preferred embodiment, the front output shaft portion of the output shaft and the first shaft of the front gear mechanism are arranged substantially coaxial with each other, and the rear output shaft portion of the output shaft and the first shaft of the rear gear mechanism are arranged substantially coaxial with each other, whereby there is no need to use any universal joint in order to connect the front output shaft portion of the output shaft and the first shaft of the front gear mechanism to each other and there is no need of using any universal joint in order to connect the rear output shaft portion of the output shaft and the first shaft of the rear gear mechanism to each other, so that it is possible to inhibit the first shaft of the front gear mechanism and the first shaft of the rear gear mechanism from being varied in angular velocity in driving. Thereby, it is possible to prevent vibrations and noise from being generated in respective connections of the output shaft to the front gear mechanism and the rear gear mechanism.

In the small-sized vehicle in the present preferred embodiment, there are preferably provided a front shaft that connects the front output shaft portion of the output shaft and the first shaft of the front gear mechanism to each other and is arranged substantially coaxial with the front output shaft portion of the output shaft and the first shaft of the front gear mechanism, and a rear shaft that connects the rear output shaft portion of the output shaft and the first shaft of the rear gear mechanism to each other and is arranged substantially coaxial with the rear output shaft portion of the output shaft and the first shaft of the rear gear mechanism. With such a construction, the front output shaft portion of the output shaft and the first shaft of the front gear mechanism can be easily connected to each other by the front shaft and the rear output shaft portion of the output shaft and the first shaft of the rear gear mechanism can be easily connected to each other by the rear shaft, so that it is possible to easily transmit a drive force from the output shaft to the first shaft of the front gear mechanism and the first shaft of the rear gear mechanism.

In the small-sized vehicle provided with the front shaft and the rear shaft, preferably, the front output shaft portion and the rear shaft portion of the output shaft are arranged substantially coaxial with each other and the front shaft and the rear shaft are arranged substantially coaxial with each other. With such a construction, the front output shaft portion and the rear output shaft portion of the output shaft, which are arranged coaxial with each other, make it possible to simplify the output shaft in construction.

In the small-sized vehicle, in which the front shaft and the rear shaft are arranged substantially coaxial with each other, the front shaft and the rear shaft may be arranged, as viewed in plan view, on a line in parallel to a center line and spaced a predetermined distance from the center line in the vehicle breadth direction, in a direction perpendicular to the center line.

In the small-sized vehicle in the present preferred embodiment, preferably, one of the front gear mechanism and the rear gear mechanism includes a second shaft, which is arranged in a direction that is substantially perpendicular to an axial direction of the first shaft of one of the front gear mechanism and the rear gear mechanism and to which a drive force from the first shaft of the one is transmitted, and a third shaft, which is arranged substantially in parallel to an axial direction of the second shaft and to which a drive force from the second shaft is transmitted. In this manner, by arranging the third shaft substantially in parallel to the axial direction of the second shaft, a portion in which a drive force is transmitted to the third shaft from the second shaft can be arranged in an optional position along the axial direction of the second shaft (a vehicle breadth direction), so that it is possible to arrange the third shaft offset relative to the second shaft in the vehicle breadth direction. As a result, in the case where the first shafts are arranged so that the first shafts of the front gear mechanism and the rear gear mechanism become substantially coaxial with the front output shaft portion of the output shaft, a position of a center of the third shaft in the vehicle breadth direction (left and right direction) can be arranged in the neighborhood of a center line in the vehicle breadth direction even in the case where a position of a center of the second shaft, which is arranged in a direction perpendicular to the first shaft, in the vehicle breadth direction (left and right direction) is offset from the center line in the vehicle breadth direction. As a result, it is possible to minimize the spacing between the third shaft and a pair of rear wheels (or a pair of front wheels) from differing in the left and right direction in the case where a drive force is transmitted to the pair of rear wheels (or the pair of front wheels) from the third shaft, so that the third shaft can favorably transmit a drive force to the pair of rear wheels (or the pair of front wheels).

In the small-sized vehicle, in which one of the front gear mechanism and the rear gear mechanism includes the first shaft, the second shaft, and the third shaft, preferably, the first shaft of one of the front gear mechanism and the rear gear mechanism is provided with a bevel gear, the second shaft of one of the front gear mechanism and the rear gear mechanism is provided with a bevel gear, which connects to the bevel gear of the first shaft of the one, and a gear, the third shaft of one of the front gear mechanism and the rear gear mechanism is provided with a gear, which connects to the gear of the second shaft of the one, and the third shaft of the one transmits a drive force to one of the front wheel and the rear wheel. With such a construction, a drive force can be easily transmitted to the front wheel or the rear wheel through the first shaft, the second shaft, and the third shaft. Also, by providing the bevel gear on the first shaft of one of the front gear mechanism and the rear gear mechanism, providing the bevel gear, which connects to the bevel gear of the first shaft of the one, and the gear on the second shaft of one of the front gear mechanism and the rear gear mechanism, and providing the gear, which connects to the gear of the second shaft of the one on the third shaft of one of the front gear mechanism and the rear gear mechanism, rotation of the first shaft of the one can be reduced in speed in two stages by the bevel gear provided on the first shaft, the bevel gear and the gear provided on the second shaft, and the gear provided on the third shaft to be transmitted to the third shaft, so that there is no need to provide any large diameter gear on the third shaft as in the case where the second shaft is not provided and rotation of the first shaft is reduced in speed in one stage to be transmitted to the third shaft. Thereby, it is possible to decrease the gear diameter provided on the third shaft, so that it is possible to make one of the front gear mechanism and the rear gear mechanism small in size.

In the small-sized vehicle, in which one of the front gear mechanism and the rear gear mechanism includes the first shaft, the second shaft, and the third shaft, preferably, the other of the front gear mechanism and the rear gear mechanism further includes a second shaft, which is arranged in a direction that is substantially perpendicular to an axial direction of the first shaft of the other of the front gear mechanism and the rear gear mechanism and to which a drive force from the first shaft of the other is transmitted. With such a construction, a drive force from the output shaft can be easily transmitted to the front wheel or the rear wheel through the first shaft and the second shaft.

In the small-sized vehicle, in which the other of the front gear mechanism and the rear gear mechanism includes the first shaft and the second shaft, preferably, the first shaft of the other of the front gear mechanism and the rear gear mechanism is provided with a bevel gear, the second shaft of the other of the front gear mechanism and the rear gear mechanism is provided with a bevel gear, which connects to the bevel gear of the first shaft of the other, and the second shaft of the other transmits a drive force to one of the front wheel and the rear wheel. With such a construction, a drive force can be easily transmitted to the front wheel or the rear wheel through the first shaft and the second shaft.

In the small-sized vehicle, in which the other of the front gear mechanism and the rear gear mechanism includes the first shaft and the second shaft, preferably, the first shaft of one of the front gear mechanism and the rear gear mechanism is provided with a bevel gear, the second shaft of one of the front gear mechanism and the rear gear mechanism is provided with a bevel gear, which connects to the bevel gear of the first shaft of the one, the first shaft of the other of the front gear mechanism and the rear gear mechanism is provided with a bevel gear, the second shaft of the other of the front gear mechanism and the rear gear mechanism is provided with a bevel gear, which connects to the bevel gear of the first shaft of the other, and the bevel gear of the second shaft of the one and the bevel gear of the second shaft of the other are arranged, as viewed in plan view, on the same side as axes of the first shaft of the one and the first shaft of the other in a direction that is substantially perpendicular to the axes. With such a construction, an opposite end of the second shaft of the one to the bevel gear and an opposite end of the second shaft of the other to the bevel gear, respectively, can be prevented from being extended and arranged on opposite sides in the vehicle breadth direction unlike the case where the bevel gear on the second shaft of the one and the bevel gear on the second shaft of the other are arranged on opposite sides relative to axes of the first shaft, so that it is possible to prevent a vehicle body from increasing in the breadth direction.

In the small-sized vehicle, in which the other of the front gear mechanism and the rear gear mechanism includes the first shaft and the second shaft, preferably, the third shaft of one of the front gear mechanism and the rear gear mechanism mounts thereto a first constant velocity joint connected to one of the front wheel and the rear wheel, and the second shaft of the other of the front gear mechanism and the rear gear mechanism mounts thereto a second constant velocity joint connected to the other of the front wheel and the rear wheel. With such a construction, it is possible to easily drive the front wheel and the rear wheel.

In the small-sized vehicle, in which one of the front gear mechanism and the rear gear mechanism includes the first shaft, the second shaft, and the third shaft, preferably, the rear gear mechanism includes the first shaft, the second shaft, and the third shaft. With such a construction, it is possible to minimize the spacing between the third shaft and the rear wheels from differing in the left and right direction (the vehicle breadth direction), so that the third shaft can favorably transmit a drive force to the pair of the rear wheels.

In the small-sized vehicle, in which one of the front gear mechanism and the rear gear mechanism includes the first shaft, the second shaft, and the third shaft, preferably, a braking mechanism is preferably mounted to either of the first shaft and the second shaft of one of the front gear mechanism and the rear gear mechanism. With such a construction, the third shaft being a drive shaft can be made simple in structure as compared with the case where a braking mechanism is mounted to the third shaft, which serves as a drive shaft for the front wheel or the rear wheel.

In the small-sized vehicle in the present preferred embodiment, preferably, there is further provided a front shaft having a spline portion that connects between the front output shaft portion of the output shaft and the first shaft of the front gear mechanism. With such a construction, it is possible to easily connect the front output shaft portion of the output shaft and the first shaft of the front gear mechanism to each other.

In the small-sized vehicle in the present preferred embodiment, preferably, there is further provided a rear shaft having a spline portion that connects between the rear output shaft portion of the output shaft and the first shaft of the rear gear mechanism. With such a construction, it is possible to easily connect the rear output shaft portion of the output shaft and the first shaft of the rear gear mechanism to each other.

In the small-sized vehicle in the present preferred embodiment, preferably, the small-sized vehicle is an ATV (All Terrain Vehicle). With such a construction, it is possible to obtain an ATV capable of preventing vibrations and noise from being generated.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
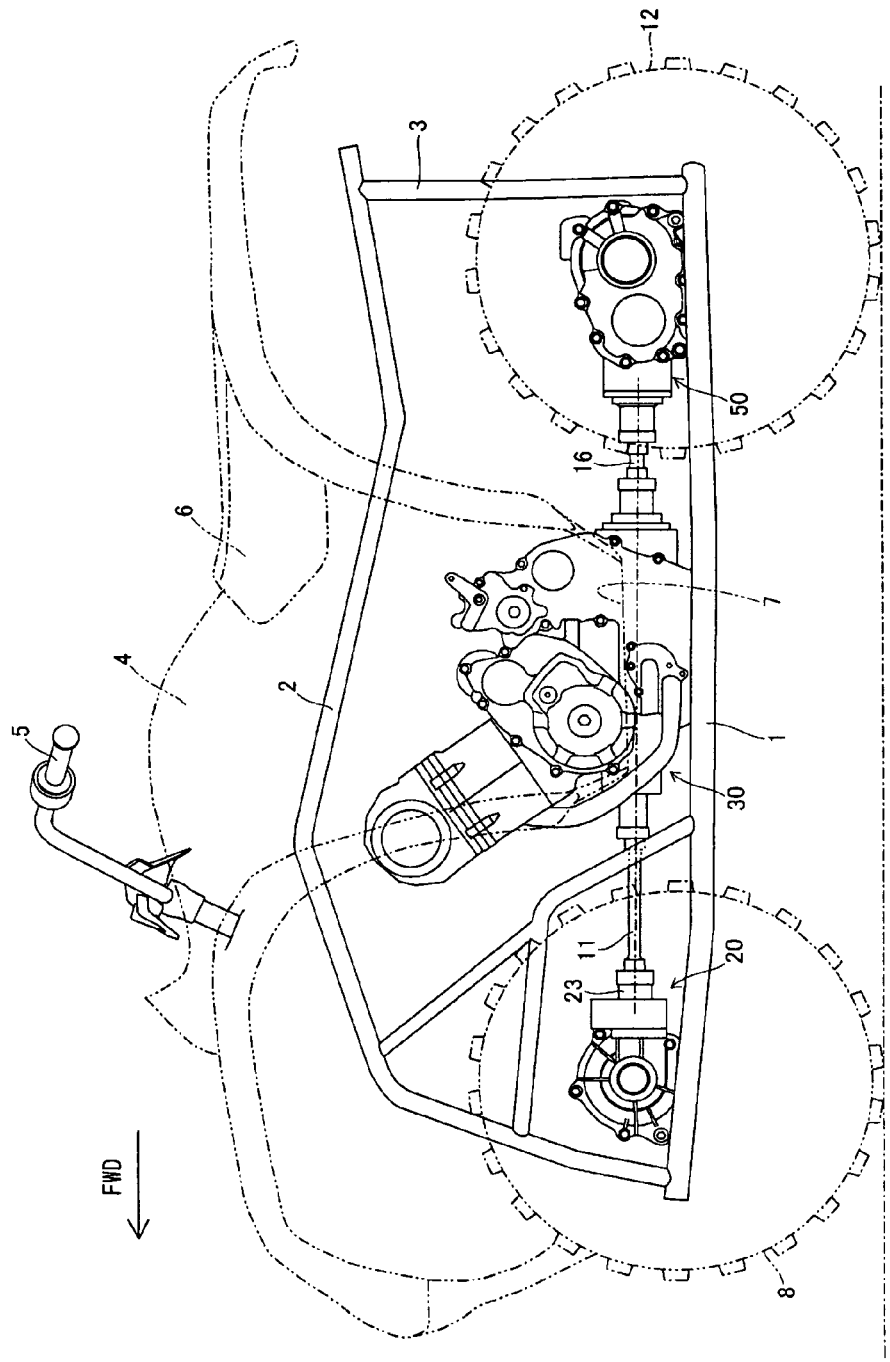
FIG. 1 is a side view showing a whole construction of an ATV according to a preferred embodiment of the present invention.

Preferred embodiments of the present invention will be described below with reference to the drawings.

The construction of an ATV according to a preferred embodiment of the present invention will be described in detail with reference to FIGS. 1 to 6. In addition, the present preferred embodiment will be described with respect to an ATV merely as an example of a small-sized vehicle according to the present invention. In the drawings, an arrow FWD indicates the front in a travel direction of the ATV and an arrow W indicates a vehicle breadth direction.

Figure 2:
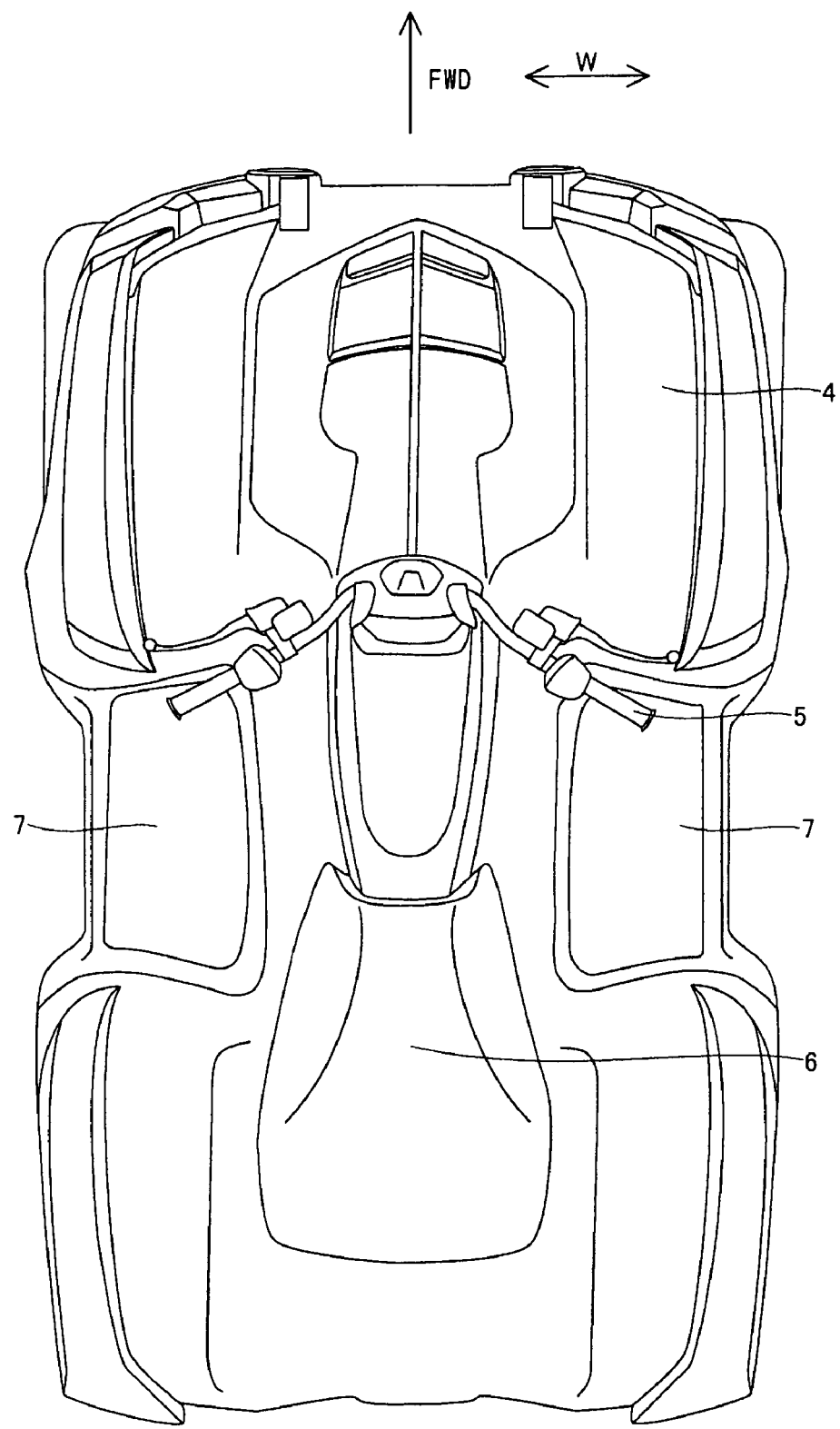
FIG. 2 is a plan view showing the whole construction of the ATV, according to the preferred embodiment shown in FIG. 1.

In the ATV according to the present preferred embodiment of the present invention, a main frame 1 is arranged to extend from the front of a vehicle body to the rear as shown in FIG. 1. A forward end of an upper frame 2 is fixed to a forward end of the main frame 1. Back stays 3 are fixed between a rear end of the main frame 1 and a rear end of the upper frame 2. A vehicle body cover 4 is provided above the upper frame 2. A handlebar 5 is provided above the vehicle body cover 4 to be able to turn as shown in FIG. 2. A seat 6 is arranged rearwardly of the handlebar 5. A foot rest 7 is arranged between the handlebar 5 and the seat 6.

Figure 3:
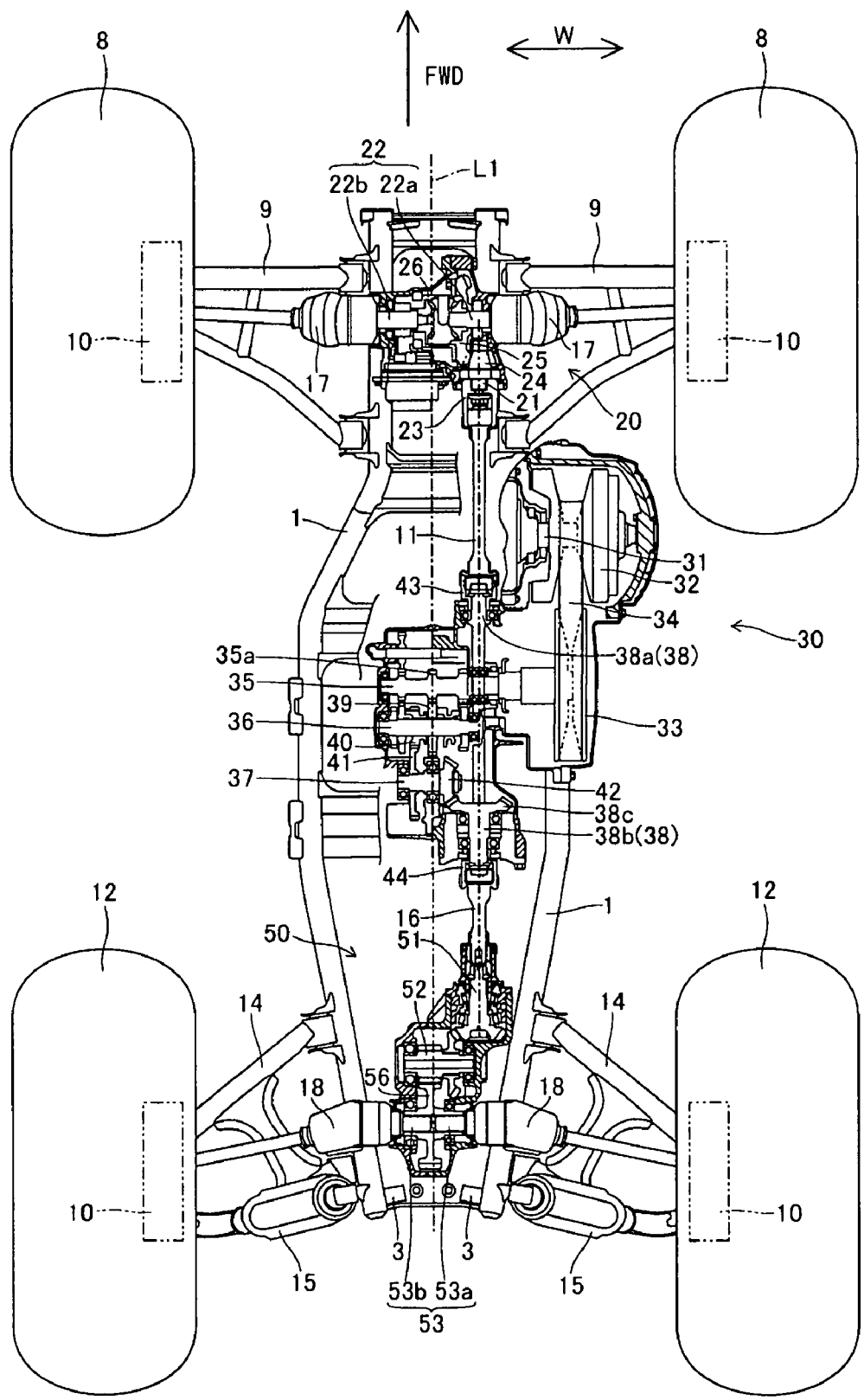
FIG. 3 is a cross sectional view showing the whole construction of the ATV, according to the preferred embodiment shown in FIG. 1.

Upper arms (not shown) and lower arms 9 by which front wheels 8 are supported, respectively, are mounted to the forward end of the upper frame 2 (see FIG. 1) and a forward end of the main frame 1 as shown in FIG. 3. A front gear casing 20 for transmission of a drive force to the front wheels 8 is mounted to a forward portion of the main frame 1 as shown in FIG. 1. In addition, the front gear casing 20 is exemplary of a "front gear mechanism" of the present preferred embodiment of the invention. The front wheels 8 are arranged laterally of the front gear casing 20. Disk brakes 10 (see FIG. 3) are mounted to the front wheels 8. An engine 30 is mounted rearwardly of the front gear casing 20. A front shaft 11 is provided between the front gear casing 20 and the engine 30.

Figure 4:
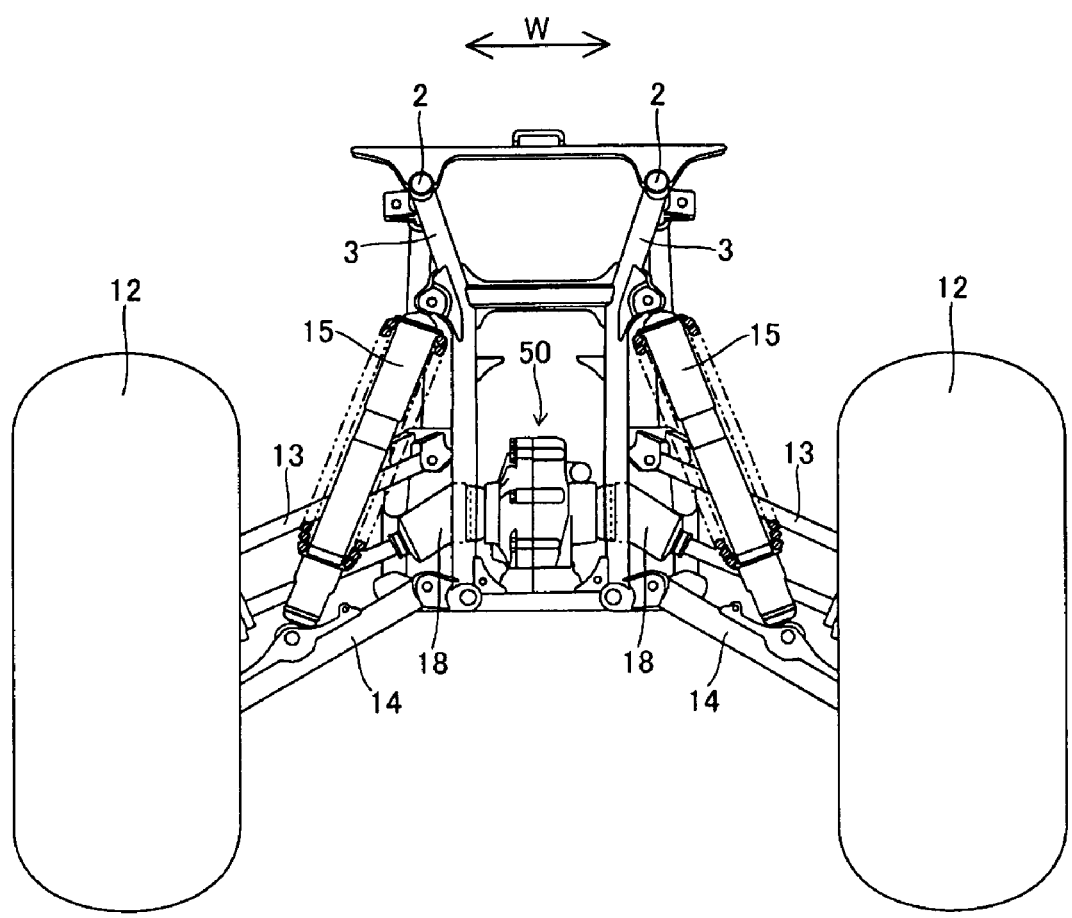
FIG. 4 is a view showing the ATV, according to the preferred embodiment shown in FIG. 1, as viewed from the rear.

Upper arms 13 and lower arms 14, by which rear wheels 12 are supported, respectively, are mounted to rear portions of the back stays 3 and the main frame 1 as shown in FIG. 4. Rear suspensions 15 are mounted between central portions of the lower arms 14 and the back stays 3. A rear gear casing 50 for transmission of a drive force to the rear wheels 12 from the engine 30 is mounted to a rear portion of the main frame 1 as shown in FIG. 1. In addition, the rear gear casing 50 is exemplary of a "rear gear mechanism" of the present preferred embodiment of the invention. Rear wheels 12 are arranged laterally of the rear gear casing 50. Disk brakes 10 (see FIG. 3) are mounted to the rear wheels 12. A rear shaft 16 is provided between the rear gear casing 50 and the engine 30.

According to the present preferred embodiment, the front shaft 11 and the rear shaft 16 are arranged substantially coaxial with each other as shown in FIGS. 1 and 3. Also, the front shaft 11 and the rear shaft 16 are arranged on a line, which is in parallel to a center line (L1) and spaced a predetermined distance from the center line (L1) in the vehicle breadth direction on the right in a direction perpendicular to the center line (L1) as viewed in plan view, as shown in FIG. 3.

Figure 5:
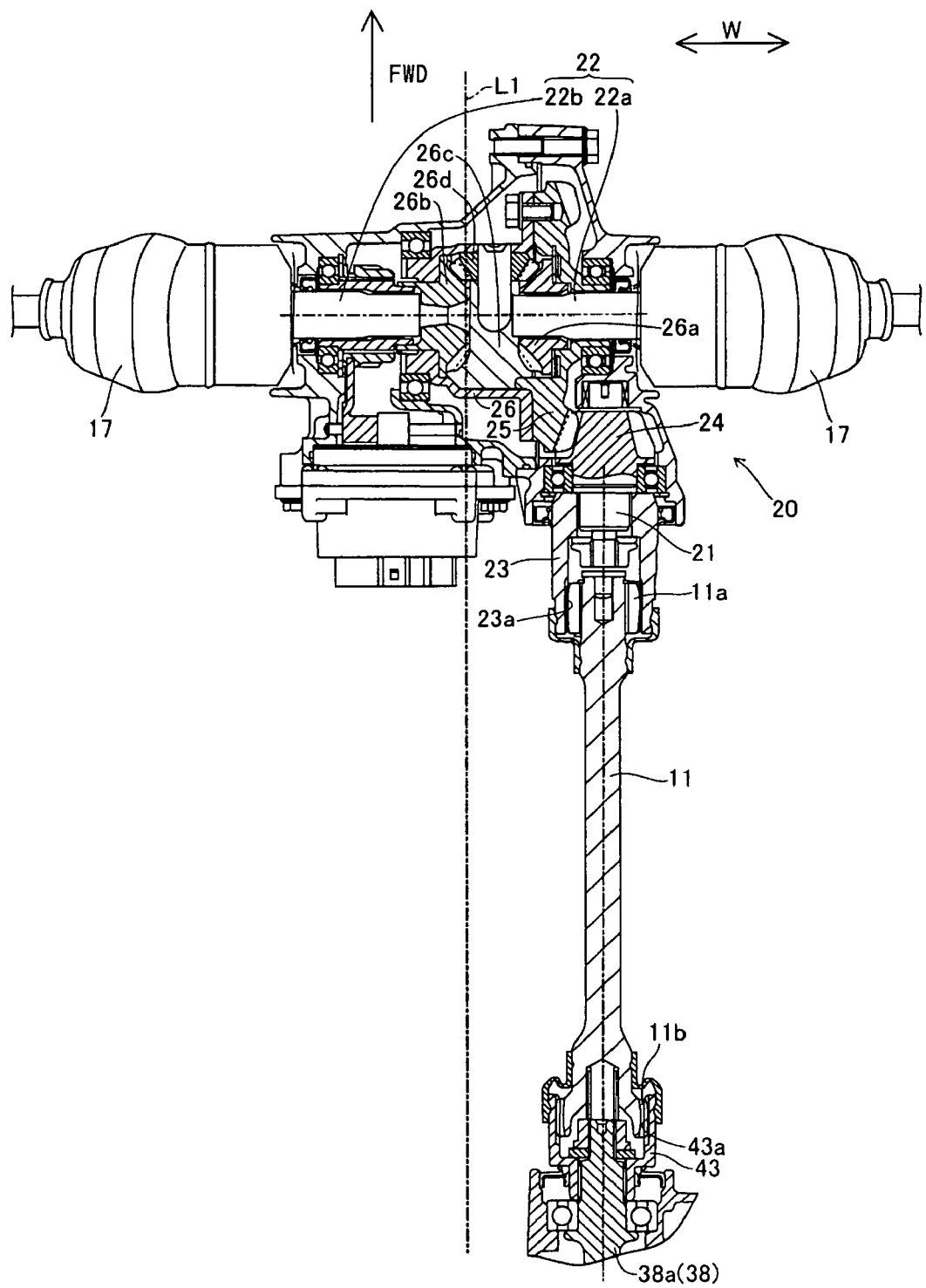
FIG. 5 is a cross sectional view showing an area of a front gear casing of the ATV, according to the preferred embodiment shown in FIG. 1.

Provided on the front gear casing 20 are a front input shaft 21, to which a drive force is transmitted from the front shaft 11, and a front wheel drive shaft 22, to which a drive force is transmitted from the front input shaft 21 as shown in FIG. 5. In addition, the front input shaft 21 is exemplary of a "first shaft of front gear mechanism" of the present preferred embodiment of the invention, and the front wheel drive shaft 22 is exemplary of "second shaft of front gear mechanism" of the present preferred embodiment of the invention.

According to the present preferred embodiment, the front input shaft 21 is arranged substantially coaxial with the front shaft 11. A forward portion of a cylinder member 23 is attached to a spline mounted to a rear portion of the front input shaft 21.

According to the present preferred embodiment, a spline hole 23a is provided on a rear portion of the cylinder member 23 to correspond to a spherical-shaped spline 11a of the front shaft 11. The spline 11a of the front shaft 11 is inserted into the spline hole 23a of the cylinder member 23. Thereby, a drive force from the front shaft 11 can be transmitted to the front input shaft 21 via the cylinder member 23. A forward portion of the front input shaft 21 is provided with a bevel gear 24. A bevel gear 25 provided on the front wheel drive shaft 22 meshes with the bevel gear 24. Also, the bevel gears 24, 25 are configured such that rotation speed from the front input shaft 21 is reduced to some extent when transmitted to the bevel gear 25.

According to the present preferred embodiment, the bevel gear 25 on the front wheel drive shaft 22 is arranged on the left of an axis of the front input shaft 21 in a direction perpendicular to the axis of the front input shaft 21 as viewed in plan view. The bevel gear 25 on the front wheel drive shaft 22 is configured to rotate integrally with a differential gear casing 26 as the bevel gear 24 on the front input shaft 21 rotates. The differential gear casing 26 functions to transmit a drive force to a right drive shaft 22a and a left drive shaft 22b, respectively, of the front wheel drive shaft 22. The differential gear casing 26 is provided with side gears 26a, 26b and pinion gears 26c, 26d. The differential gear casing 26 is configured such that the pinion gears 26c, 26d rotate the side gears 26a, 26b in opposite directions to each other whereby different speeds of rotation are imparted to the right drive shaft 22a and the left drive shaft 22b of the front wheel drive shaft 22.

According to the present preferred embodiment, the right drive shaft 22a and the left drive shaft 22b of the front wheel drive shaft 22 are arranged substantially coaxial with each other and in a direction perpendicular to axial directions of the front shaft 11 and the front input shaft 21.

According to the present preferred embodiment, constant velocity joints 17, respectively, are mounted to the right drive shaft 22a and the left drive shaft 22b of the front wheel drive shaft 22. The constant velocity joints 17 are exemplary of a "second constant velocity joint" of the present preferred embodiment of the invention. The pair of the front wheels 8 are connected to the pair of constant velocity joints 17 as shown in FIG. 3. Thereby, a drive force from the front wheel drive shaft 22 can be transmitted to the front wheels 8.

Provided on the engine 30 are a centrifugal clutch 31 connected to a crankshaft (not shown), a primary sheave 32, to which a drive force from the centrifugal clutch 31 is transmitted, a secondary sheave 33, a belt 34 mounted to the primary sheave 32 and the secondary sheave 33, a plurality of transmission shafts 35, 36, 37, to which a drive force from the secondary sheave 33 is transmitted, and an output shaft 38 having a forward output shaft portion 38a and a rear output shaft portion 38b.

The primary sheave 32 is mounted to an end of the centrifugal clutch 31. The secondary sheave 33 is rotated via the primary sheave 32 and the belt 34 as the centrifugal clutch 31 rotates. A continuously variable transmission is defined by the primary sheave 32, the secondary sheave 33, and the belt 34. Also, the transmission shaft 35 is mounted to the secondary sheave 33. A gear 35a is provided integral with the transmission shaft 35 and a gear 39 provided on the transmission shaft 36 meshes with the gear 35a. The transmission shaft 36 is arranged substantially in parallel to an axial direction of the transmission shaft 35. A gear 40 is provided on the transmission shaft 36 and a gear 41 provided on the transmission shaft 37 meshes with the gear 40. The transmission shaft 37 is arranged substantially in parallel to axial directions of the transmission shaft 35 and the transmission shaft 36.

A bevel gear 42 is provided on the transmission shaft 37. A bevel gear 38c that is integral with the rear output shaft portion 38b of the output shaft 38 meshes with the bevel gear 42. The forward output shaft portion 38a and the rear output shaft portion 38b of the output shaft 38 are rotated together as the bevel gear 42 rotates.

According to the present preferred embodiment, the forward output shaft portion 38a and the rear output shaft portion 38b of the output shaft 38 are arranged substantially coaxial with the front input shaft 21 of the front gear casing 20 and the front shaft 11.

A rear portion of a cylinder member 43 is mounted in a spline attached to a forward portion of the forward output shaft portion 38a of the output shaft 38 as shown in FIG. 5.

According to the present preferred embodiment, a spline hole 43a is provided on a forward portion of the cylinder member 43 to correspond to a spherical-shaped spline 11b of the front shaft 11. The spline 11b of the front shaft 11 is inserted into the spline hole 43a of the cylinder member 43. Thereby, a drive force from the forward output shaft portion 38a of the output shaft 38 can be transmitted to the front shaft 11 via the cylinder member 43.

Figure 6:
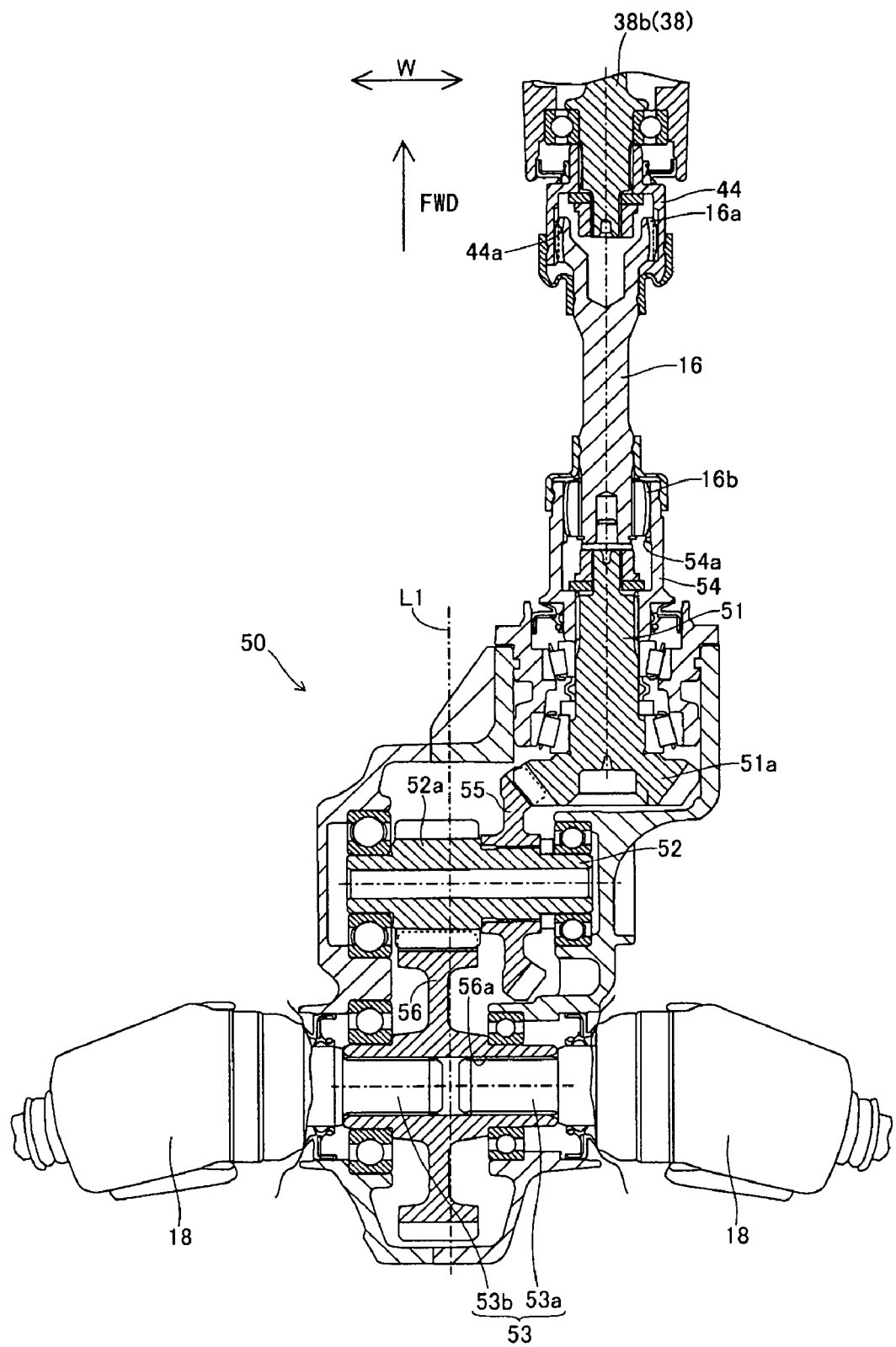
FIG. 6 is a cross sectional view showing an area of a rear gear casing of the ATV, according to the preferred embodiment shown in FIG. 1.

A forward portion of a cylinder member 44 is mounted in a spline attached to a rear portion of the rear output shaft portion 38b of the output shaft 38 as shown in FIG. 6.

According to the present preferred embodiment, a spline hole 44a is provided on a rear portion of the cylinder member 44 to correspond to a spherical-shaped spline 16a of the rear shaft 16. The spline 16a of the rear shaft 16 is inserted into the spline hole 44a of the cylinder member 44. As a result, a drive force from the rear output shaft portion 38b of the output shaft 38 can be transmitted to the rear shaft 16 via the cylinder member 44.

Provided on the rear gear casing 50 are a rear input shaft 51 to which a drive force is transmitted from the rear shaft 16, a transmission shaft 52 to which a drive force is transmitted from the rear input shaft 51, and a rear wheel drive shaft 53 to which a drive force is transmitted from the transmission shaft 52. In addition, the rear input shaft 51 is exemplary of a "first shaft of rear gear mechanism" of the present preferred embodiment of the invention, and the transmission shaft 52 is exemplary of a "second shaft of rear gear mechanism" of the present preferred embodiment of the invention. Also, the rear wheel drive shaft 53 is exemplary of a "third shaft of rear gear mechanism" of the present preferred embodiment of the invention.

According to the present preferred embodiment, the rear input shaft 51 is arranged substantially coaxial with the rear shaft 16 and the rear output shaft portion 38b of the output shaft 38. A rear portion of a cylinder member 54 is mounted in a spline attached to a forward portion of the rear input shaft 51.

A spline hole 54a is provided on a forward portion of the cylinder member 54 to correspond to a spherical-shaped spline 16b of the rear shaft 16. The spline 16b of the rear shaft 16 is inserted into the spline hole 54a of the cylinder member 54. Thereby, a drive force from the rear shaft 16 can be transmitted to the rear input shaft 51 via the cylinder member 54. A bevel gear 51a is provided integral with a rear portion of the rear input shaft 51 and a bevel gear 55 provided on the transmission shaft 52 meshes with the bevel gear 51a. The bevel gears 51a, 55 are configured such that the rotation speed from the rear input shaft 51 is reduced to some extent when transmitted to the transmission shaft 52.

The bevel gear 55 is arranged on the left of an axis of the rear input shaft 51 in a direction perpendicular to the axis of the rear input shaft 51 as viewed in plan view. The transmission shaft 52 is configured to rotate integrally with the bevel gear 55 as the bevel gear 51a rotates.

The transmission shaft 52 is arranged in a direction substantially perpendicular to axial directions of the rear shaft 16 and the rear input shaft 51.

A gear 52a is integral with the transmission shaft 52. A gear 56 meshes with the gear 52a of the transmission shaft 52 and the gears 52a, 56 are configured such that rotation speed from the transmission shaft 52 is reduced to some extent when transmitted to the gear 56. Meshing portions of the gear 52a of the transmission shaft 52 and the gear 56 are arranged on the center line (L1) in the vehicle breadth direction (the direction indicated by the arrow W). A right drive shaft 53a and a left drive shaft 53b of the rear wheel drive shaft 53 are inserted into a shaft hole 56a of the gear 56. As a result, a drive force from the transmission shaft 52 can be transmitted through the gear 56 to the right drive shaft 53a and the left drive shaft 53b of the rear wheel drive shaft 53. In this manner, according to the present preferred embodiment, rotation of the rear input shaft 51 is reduced in speed in two stages by the bevel gears 51a, 55 and the gears 52a, 56 when transmitted to the rear wheel drive shaft 53 whereby there is no need to provide any large diameter gear on the rear wheel drive shaft 53 as in the case where the transmission shaft 52 is not provided and rotation of the rear input shaft 51 is reduced in speed in one stage when transmitted to the rear wheel drive shaft 53. Therefore, it is possible to decrease the gear 56 in diameter, so that it is possible to make the rear gear casing 50 small in size. In addition, since torque applied on the rear wheels 12 normally becomes large as compared with torque applied on the front wheels 8, the gears on the rear wheels 12 and the rear gear casing 50 are liable to become large in size. Therefore, as in the present preferred embodiment, it is effective to reduce a side of the rear wheels 12 in speed in two stages to make the gears on the rear wheels 12 and the rear gear casing 50 small in size.

According to the present preferred embodiment, the right drive shaft 53a and the left drive shaft 53b of the rear wheel drive shaft 53 are arranged substantially coaxial with each other and substantially in parallel to an axial direction of the transmission shaft 52.

Constant velocity joints 18 are mounted to the right drive shaft 53a and the left drive shaft 53b of the rear wheel drive shaft 53. In addition, the constant velocity joints 18 are exemplary of a "first constant velocity joint" of the present preferred embodiment of the invention. Also, the rear wheels 12 are connected to the constant velocity joints 18 as shown in FIG. 3. Thereby, a drive force from the rear wheel drive shaft 53 can be transmitted to the rear wheels 12.

According to the present preferred embodiment, the forward output shaft portion 38a of the output shaft 38 and the front input shaft 21 of the front gear casing 20 are arranged substantially coaxial with each other and the rear output shaft portion 38b of the output shaft 38 and the rear input shaft 51 of the rear gear casing 50 are arranged substantially coaxial with each other. Thereby the forward output shaft portion 38a of the output shaft 38 and the front input shaft 21 of the front gear casing 20 can be connected to each other by the front shaft 11, which includes the splines 11a, 11b, and the rear output shaft portion 38b of the output shaft 38 and the rear input shaft 51 of the rear gear casing 50 can be connected to each other by the rear shaft 16, which includes the splines 16a, 16b, without the medium of any universal joint. Accordingly, there is no need to use any universal joint in order to connect the forward output shaft portion 38a of the output shaft 38 and the front input shaft 21 of the front gear casing 20 to each other and there is no need to use any universal joint in order to connect the rear output shaft portion 38b of the output shaft 38 and the rear input shaft 51 of the rear gear casing 50 to each other. Thereby, since it is possible to inhibit the front input shaft 21 of the front gear casing 20 and the rear input shaft 51 of the rear gear casing 50 from being varied in angular velocity in driving, it is possible to prevent vibrations and noise from being generated in the connections of the output shaft 38 to the front gear casing 20 and the rear gear casing 50. In addition, in case of using universal joints, the front input shaft 21 of the front gear casing 20 and the rear input shaft 51 of the rear gear casing 50 involve variation in angular velocity, and such variation acts in some cases on backlash (clearance) between respective gears inside the engine 30 and on clearances of engaging portions of moving parts in the transmission to thereby generate vibrations and noise inside the engine 30. According to the present preferred embodiment, since there is no need of using any universal joint, it is possible to prevent vibrations and noise from being generated inside the engine 30.

Also, according to the present preferred embodiment, by arranging the front shaft 11 and the rear shaft 16 substantially coaxial with each other, it is possible to simplify the construction of the forward output shaft portion 38a and the rear output shaft portion 38b, which are arranged substantially coaxial with each other, of the output shaft 38.

Also, according to the present preferred embodiment, by arranging the rear wheel drive shaft 53 substantially in parallel to the axial direction of the transmission shaft 52, engaging portions of the gear 52a of the transmission shaft 52 and the gear 56 provided on the rear wheel drive shaft 53 can be arranged in optional positions along the vehicle breadth direction, so that it is possible to arrange the rear wheel drive shaft 53 offset relative to the transmission shaft 52 in the vehicle breadth direction. As a result, in the case where the rear input shaft 51 is arranged so that the rear input shaft 51 of the rear gear casing 50 becomes substantially coaxial with the rear output shaft portion 38b of the output shaft 38, a position of a center of the rear wheel drive shaft 53 in the vehicle breadth direction (left and right direction) can be arranged in the area of the center line (L1) in the vehicle breadth direction even in the case where a position of a center of the transmission shaft 52, which is arranged in a direction (the vehicle breadth direction) perpendicular to the rear input shaft 51, in the vehicle breadth direction (left and right direction) is offset from the center line (L1) in the vehicle breadth direction. As a result, it is possible to minimize the spacing between the rear wheel drive shaft 53 and the pair of the rear wheels 12 from differing in the left and right direction, so that the rear wheel drive shaft 53 can favorably transmit a drive force to the pair of the rear wheels 12.

Also, according to the present preferred embodiment, the bevel gear 55 provided on the transmission shaft 52 of the rear gear casing 50 and the bevel gear 25 provided on the front wheel drive shaft 22 of the front gear casing 20 are arranged on the left side in a direction (the vehicle breadth direction) perpendicular to axes of the rear input shaft 51 of the rear gear casing 50 and the front input shaft 21 of the front gear casing 20 as viewed in plan view. Thereby an opposite end of the transmission shaft 52 to the bevel gear 55 and an opposite end of the front wheel drive shaft 22 to the bevel gear 25, respectively, can be prevented from being extended and arranged on opposite sides in the vehicle breadth direction unlike the case where the bevel gear 55 provided on the transmission shaft 52 and the bevel gear 25 provided on the front wheel drive shaft 22 are arranged on opposite sides relative to axes of the rear input shaft 51 and the front input shaft 21, so that it is possible to prevent a vehicle body from increasing in the breadth direction.

While the present preferred embodiment indicates an ATV as an example of a small-sized vehicle, the present invention is not limited thereto but applicable to other small-sized vehicles, such as a CCV (Cross Country Vehicle), SSV (Side-by-Side Vehicle), tractor, etc., which include an engine having an output shaft for transmission of a drive force to front wheels and rear wheels.

Figure 7:
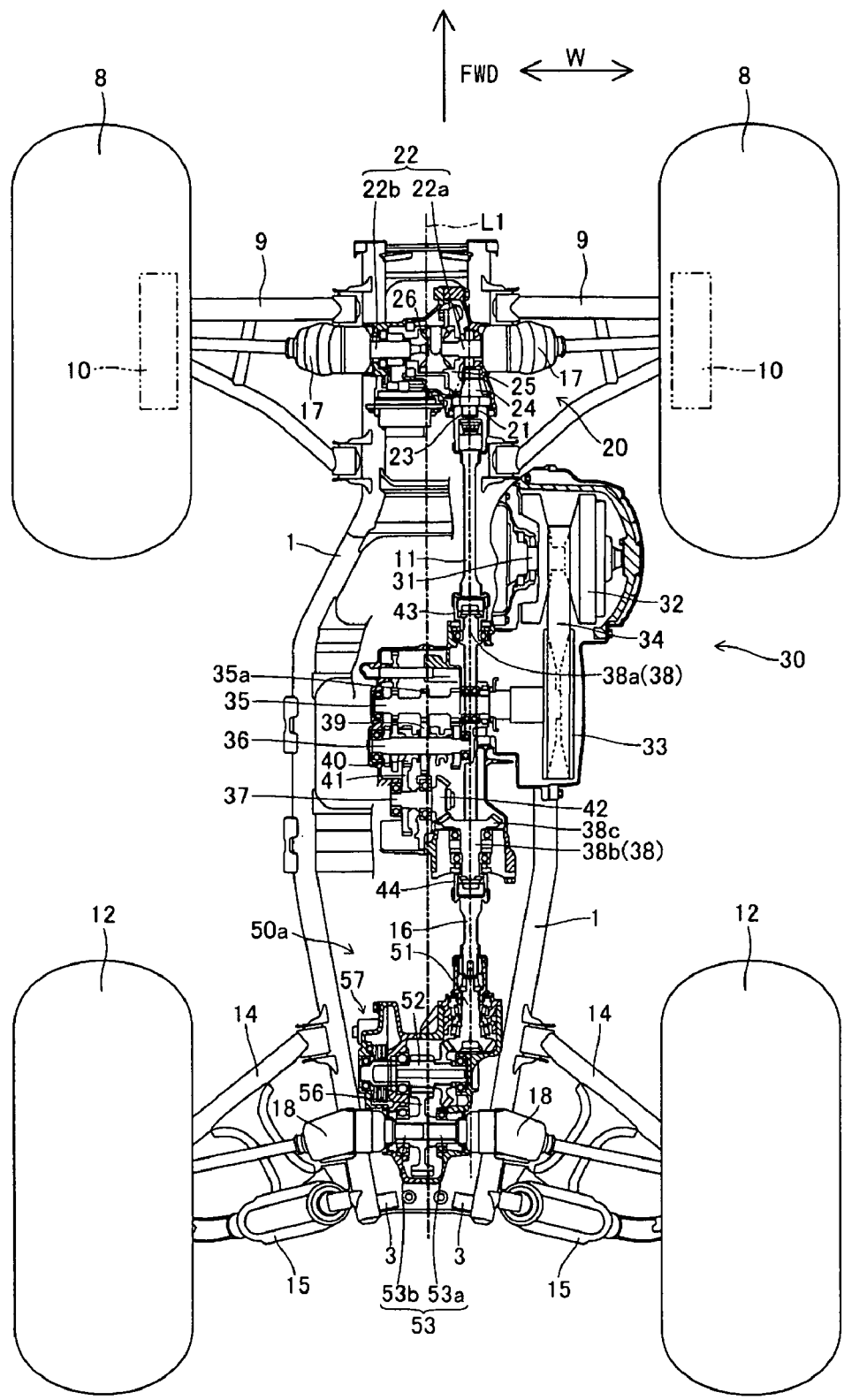
FIG. 7 is a cross sectional view showing a whole construction of an ATV according to a first modification of the preferred embodiment shown in FIG. 1.
Figure 8:
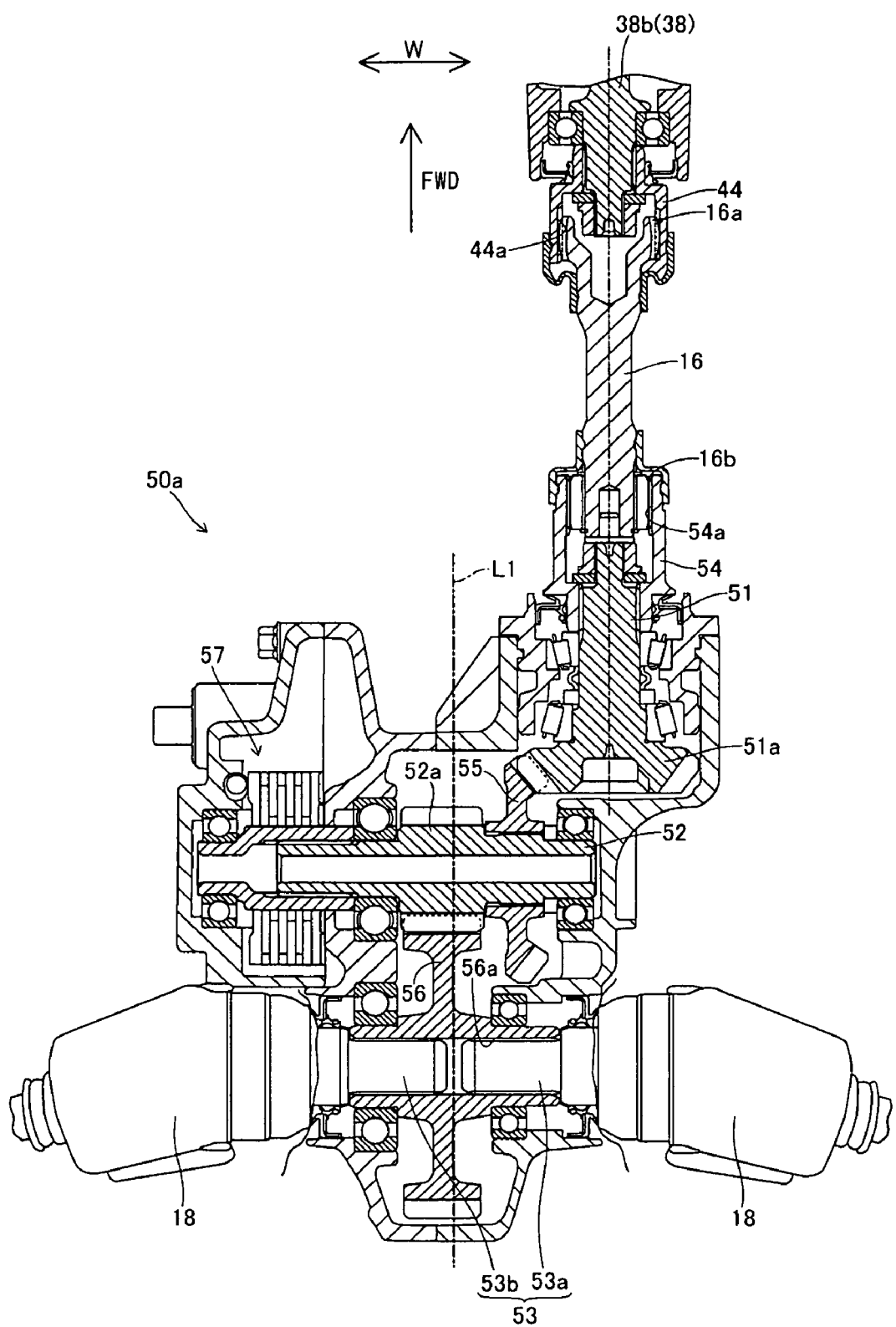
FIG. 8 is a cross sectional view showing an area of a rear gear casing of the ATV according to the first modification.
Figure 9:
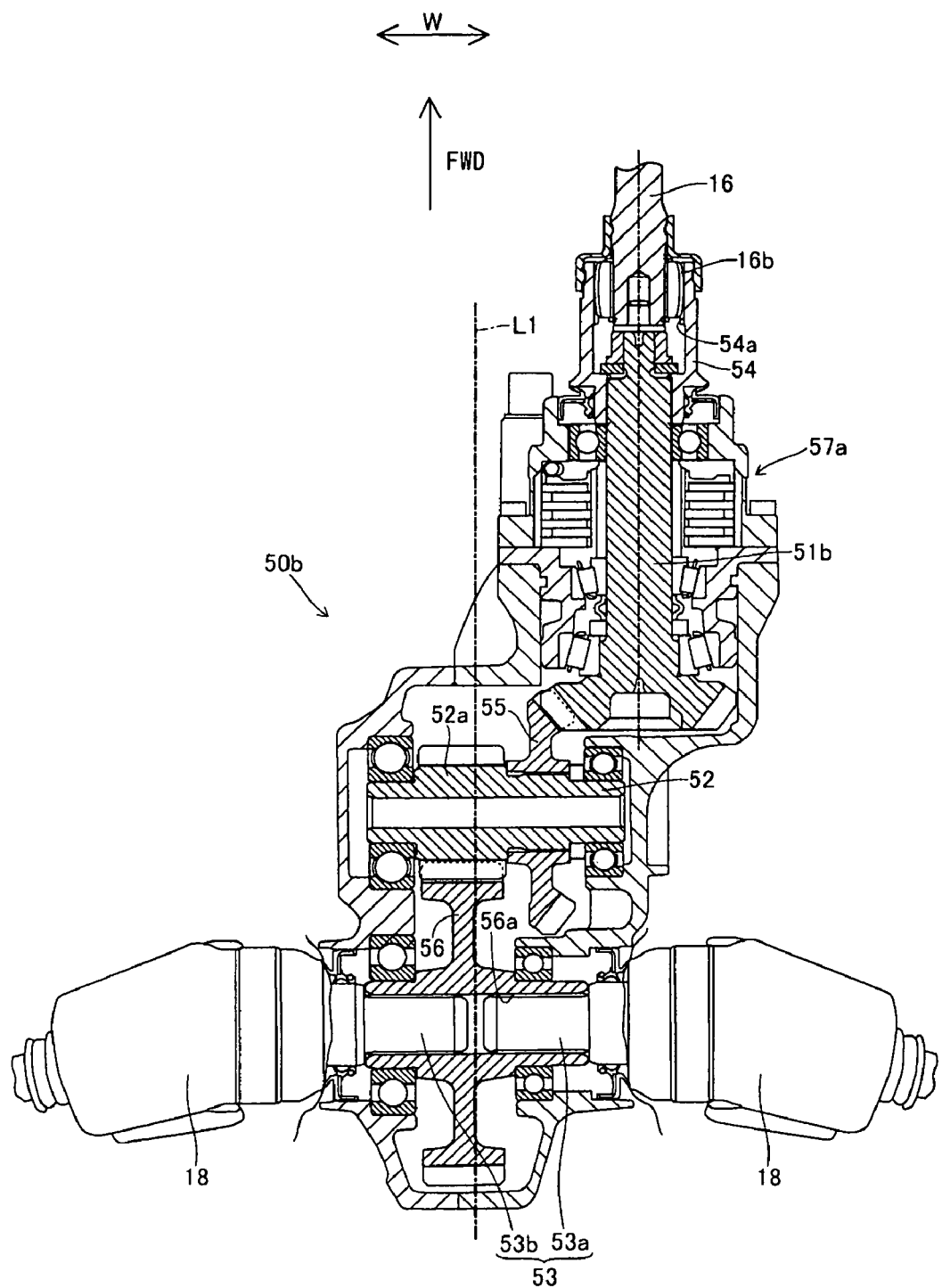
FIG. 9 is a cross sectional view showing an area of a rear gear casing of an ATV according to a second modification.

Also, while preferred embodiments have been described with respect to an example in which disk brakes are provided on rear wheels as a braking mechanism for the rear wheels, the present invention is not limited thereto but a braking mechanism such as a wet brake 57, etc. may be provided on a transmission shaft 52 of a rear gear casing 50a as in an ATV according to a first modification of the preferred embodiment shown in FIGS. 7 and 8. A braking mechanism such as a wet brake 57a, etc. may be provided on a rear input shaft 51b of a rear gear casing 50b as in an ATV according to a second modification of the preferred embodiment shown in FIG. 9. With such a construction, a rear wheel drive shaft 53 can be made simple in structure as compared with the case where a braking mechanism is mounted to the rear wheel drive shaft 53, which serves as a drive shaft for the rear wheels.

Also, while preferred embodiments have been described with respect to an example, in which the first shaft (front input shaft) and the second shaft (front wheel drive shaft) are provided in the front gear casing and the first shaft (rear input shaft), the second shaft (transmission shaft), and the third shaft (rear wheel drive shaft) are provided in the rear gear casing, the invention is not limited thereto. The first shaft (front input shaft), the second shaft (transmission shaft), and the third shaft (front wheel drive shaft) may be provided in the front gear casing and the first shaft (rear input shaft) and the second shaft (rear wheel drive shaft) may be provided in the rear gear casing.

Also, while preferred embodiments have been described with respect to an example, in which the splines on the front shaft and the rear shaft are arranged to be spherical-shaped, the present invention is not limited thereto but the splines on the front shaft and the rear shaft may have a non-spherical shape.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A small-sized vehicle comprising:
an engine including an output shaft having a front output shaft portion that transmits a drive force to a front wheel, and a rear output shaft portion that transmits a drive force to a rear wheel;
a front gear mechanism including a first shaft on a side of the front wheel which transmits a drive force to the front wheel and to which a drive force from the front output shaft portion of the output shaft is transmitted;
a rear gear mechanism including a first shaft on a side of the rear wheel which transmits a drive force to the rear wheel and to which a drive force from the rear output shaft portion of the output shaft is transmitted;
a front shaft arranged between the front output shaft portion of the output shaft and the first shaft of the front gear mechanism; and
a rear shaft arranged between the rear output shaft portion of the output shaft and the first shaft of the rear gear mechanism; wherein
the front output shaft portion of the output shaft, the first shaft of the front gear mechanism, the rear output shaft portion of the output shaft, and the first shaft of the rear gear mechanism are arranged substantially coaxial with each other;
the front shaft and the first shaft of the front gear mechanism are coupled together by a first spherically shared spline;
the front shaft and the front output shaft portion of the output shaft are coupled together by a second spherically shared spline;
the rear shaft and the rear output shaft portion of the output shaft are coupled together by a third spherically shared spline; and
the rear shaft and the first shaft of the rear gear mechanism are coupled together by a fourth spherically shaped spline.

2. The small-sized vehicle according to claim 1, wherein the front shaft that connects the front output shaft portion of the output shaft and the first shaft of the front gear mechanism to each other is arranged substantially coaxial with the front output shaft portion of the output shaft and the first shaft of the front gear mechanism, and the rear shaft that connects the rear output shaft portion of the output shaft and the first shaft of the rear gear mechanism to each other is arranged substantially coaxial with the rear output shaft portion of the output shaft and the first shaft of the rear gear mechanism.

3. The small-sized vehicle according to claim 2, wherein the front shaft and the rear shaft are arranged, as viewed in plan view, on a line that is substantially parallel to a center line and spaced a predetermined distance from the center line in a vehicle breadth direction, in a direction that is substantially perpendicular to the center line.

4. The small-sized vehicle according to claim 1, wherein one of the front gear mechanism and the rear gear mechanism includes a second shaft to which a drive force from the first shaft is transmitted, and a third shaft to which a drive force from the second shaft is transmitted.

5. The small-sized vehicle according to claim 4, wherein the second shaft is arranged in a direction substantially perpendicular to an axial direction of the first shaft, and the third shaft is arranged substantially parallel to an axial direction of the second shaft.

6. The small-sized vehicle according to claim 5, wherein the first shaft of the one gear mechanism is provided with a bevel gear, the second shaft is provided with a gear and a bevel gear which connects to the bevel gear of the first shaft, the third shaft is provided with a gear which connects to the gear of the second shaft, and the third shaft transmits a drive force to one of the front wheel and the rear wheel.

7. The small-sized vehicle according to claim 4, wherein the other of the front gear mechanism and the rear gear mechanism further includes a second shaft which is arranged in a direction substantially perpendicular to an axial direction of the first shaft of the other gear mechanism and to which a drive force from the first shaft is transmitted.

8. The small-sized vehicle according to claim 7, wherein the first shaft of the other gear mechanism is provided with a bevel gear, the second shaft is provided with a bevel gear which connects to the bevel gear of the first shaft, and the second shaft transmits a drive force to one of the front wheel and the rear wheel.

9. The small-sized vehicle according to claim 7, wherein the first shaft of the one gear mechanism is provided with a bevel gear, the second shaft of the one gear mechanism is provided with a bevel gear which connects to the bevel gear of the first shaft of the one gear mechanism, the first shaft of the other gear mechanism is provided with a bevel gear, the second shaft of the other gear mechanism is provided with a bevel gear which connects to the bevel gear of the first shaft of the other gear mechanism, and the bevel gear of the second shaft of the one gear mechanism and the bevel gear of the second shaft of the other gear mechanism are arranged, as viewed in plan view, on the same side in a vehicle breadth direction as axes of the first shaft of the one gear mechanism and the first shaft of the other gear mechanism in a direction that is substantially perpendicular to the axes.

10. The small-sized vehicle according to claim 7, wherein the third shaft of the one gear mechanism mounts thereto a first constant velocity joint connected to one of the front wheel and the rear wheel, and the second shaft of the other gear mechanism mounts thereto a second constant velocity joint connected to the other of the front wheel and the rear wheel.

11. The small-sized vehicle according to claim 4, wherein the rear gear mechanism includes the first shaft, the second shaft, and the third shaft.

12. The small-sized vehicle according to claim 4, wherein the front gear mechanism includes the first shaft, the second shaft, and the third shaft.

13. The small-sized vehicle according to claim 4, wherein a braking mechanism is mounted to either of the first shaft and the second shaft of the one gear mechanism.

14. An All Terrain Vehicle comprising the small-sized vehicle according to claim 1.

* * * * *

UNITED STATES PATENT AND TRADEMARK OFFICE
CERTIFICATE OF CORRECTION

PATENT NO. : 7,637,343 B2
APPLICATION NO. : 11/350326
DATED : December 29, 2009
INVENTOR(S) : Nakagaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Ninth Day of November, 2010

David J. Kappos
*Director of the United States Patent and Trademark Office*